(12) United States Patent
Chow et al.

(10) Patent No.: US 6,430,918 B1
(45) Date of Patent: Aug. 13, 2002

(54) SOLID FUEL TURBINE DRIVE SYSTEM

(76) Inventors: Tien-See Chow; Chun-Yuan Ho, both of 10 Confucius Plz. Apt #5 F, New York, NY (US) 10002

( * ) Notice: Subject to any disclaimer, the term of this patent is extended or adjusted under 35 U.S.C. 154(b) by 0 days.

(21) Appl. No.: 09/770,627

(22) Filed: Jan. 26, 2001

(51) Int. Cl.[7] ................................................ F02C 3/26
(52) U.S. Cl. ................................................ 60/39.464
(58) Field of Search .................... 60/39.464, 789

(56) References Cited

U.S. PATENT DOCUMENTS

| | | | |
|---|---|---|---|
| 1,580,656 A | * | 4/1926 | Coninck ..................... 110/230 |
| D142,427 S | | 9/1945 | Barre |
| 4,070,996 A | | 1/1978 | Steiger |
| 4,392,347 A | | 7/1983 | Shows |
| 4,815,275 A | | 3/1989 | Eickmann |
| 4,893,469 A | | 1/1990 | Yamashita |
| 5,012,777 A | | 5/1991 | Baker et al. |
| 5,040,943 A | * | 8/1991 | Dwyer ........................ 415/26 |
| 5,170,620 A | * | 12/1992 | Whistler ..................... 60/39.02 |

OTHER PUBLICATIONS

Steam, Its Generation and Use, Babcock and Wilcox, New York, 1968, p. 2–6.*

* cited by examiner

Primary Examiner—Ehud Gartenberg

(57) ABSTRACT

A solid fuel turbine drive system for utilizing waste coal products for environmentally friendly energy generation. The solid fuel turbine drive system includes an housing consisting of four side walls a roof and a floor, a first aperture extends through a first one of said side walls; a combustion tunnel with a first end which extends into the housing through the first aperture and a second end; a turbine assembly substantially aligned with the combustion tunnel first end such that gases being expelled from the first end turn the turbine assembly; and at least one solid fuel cell positionable within the second end of the combustion tunnel such that detonation of the solid fuel cell forces gasses out of the first end of the combustion tunnel.

10 Claims, 1 Drawing Sheet

SOLID FUEL TURBINE DRIVE SYSTEM

BACKGROUND OF THE INVENTION

1. Field of the Invention

The present invention relates to combustion drive systems and more particularly pertains to a new solid fuel turbine drive system for utilizing waste coal products for environmentally friendly energy generation.

2. Description of the Prior Art

The use of combustion drive systems is known in the prior art. More specifically, combustion drive systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,893,469; U.S. Pat. No. 4,392,347; U.S. Pat. No. 4,070,996; U.S. Pat. No. 5,012,777; U.S. Pat. No. 4,815,275; and U.S. Pat. No. Des. 142,427.

While these devices fulfill their respective, particular objectives and requirements, the aforementioned patents do not disclose a new solid fuel turbine drive system. The inventive device includes an housing consisting of four side walls a roof and a floor, a first aperture extends through a first one of said side walls; a combustion tunnel with a first end which extends into the housing through the first aperture and a second end; a turbine assembly substantially aligned with the combustion tunnel first end such that gases being, expelled from the first end turn the turbine assembly; and at least one solid fuel cell positionable within the second end of the combustion tunnel such that detonation of the solid fuel cell forces gasses out of the first end of the combustion In these respects, the solid fuel turbine drive system according to the present invention substantially departs from the conventional concepts and designs of the prior art, and in so doing provides an apparatus primarily developed for the purpose of utilizing waste coal products for environmentally friendly energy generation.

SUMMARY OF THE INVENTION

In view of the foregoing disadvantages inherent in the known types of combustion drive systems now present in the prior art, the present invention provides a new solid fuel turbine drive system construction wherein the same can be utilized for utilizing waste coal products for environmentally friendly energy generation.

The general purpose of the present invention, which will be described subsequently in greater detail, is to provide a new solid fuel turbine drive system apparatus and method which has many of the advantages of the combustion drive systems mentioned heretofore and many novel features that result in a new solid fuel turbine drive system which is not anticipated, rendered obvious, suggested, or even implied by any of the prior art combustion drive systems, either alone or in any combination thereof.

To attain this, the present invention generally comprises an housing consisting of four side walls a roof and a floor, a first aperture extends through a first one of said side walls; a combustion tunnel with a first end which extends into the housing through the first aperture and a second end; a turbine assembly substantially aligned with the combustion tunnel first end such that gases being expelled from the first end turn the turbine assembly; and at least one solid fuel cell positionable within the second end of the combustion tunnel such that detonation of the solid fuel cell forces gasses out of the first end of the combustion tunnel.

There has thus been outlined. rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception. upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new solid fuel turbine drive system apparatus and method which has many of the advantages of the combustion drive systems mentioned heretofore and many novel features that result in a new solid fuel turbine drive system which is not anticipated, rendered obvious, suggested, or even implied by any of the prior art combustion drive systems, either alone or in any combination thereof.

It is another object of the present invention to provide a new solid fuel turbine drive system which may be easily and efficiently manufactured and marketed.

It is a further object of the present invention to provide a new solid fuel turbine drive system which is of a durable and reliable construction.

An even further object of the present invention is to provide a new solid fuel turbine drive system which is susceptible of a low cost of manufacture with regard to both materials and labor, and which accordingly is then susceptible of low prices of sale to the consuming public, thereby making such solid fuel turbine drive system economically available to the buying public.

Still yet another object of the present invention is to provide a new solid fuel turbine drive system which provides in the apparatuses and methods of the prior art some of the advantages thereof, while simultaneously overcoming some of the disadvantages normally associated therewith.

Still another object of the present invention is to provide a new solid fuel turbine drive system for utilizing, waste coal products for environmentally friendly energy generation.

Yet another object of the present invention is to provide a new solid fuel turbine drive system which includes an housing consisting of four side walls a roof and a floor, a first aperture extends through a first one of said side walls; a combustion tunnel with a first end which extends into the housing through the first aperture and a second end; a turbine assembly substantially aligned with the combustion tunnel first end such that gases being expelled from the first end turn the turbine assembly; and at least one solid fuel cell positionable within the second end of the combustion tunnel such that detonation of the solid fuel cell forces gasses out of the first end of the combustion tunnel.

Still yet another object of the present invention is to provide a new solid fuel turbine drive system that utilizes waste coal dust.

Even still another object of the present invention is to provide a new solid fuel turbine drive system that is environmentally friendly and produces very low levels of particulate emissions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
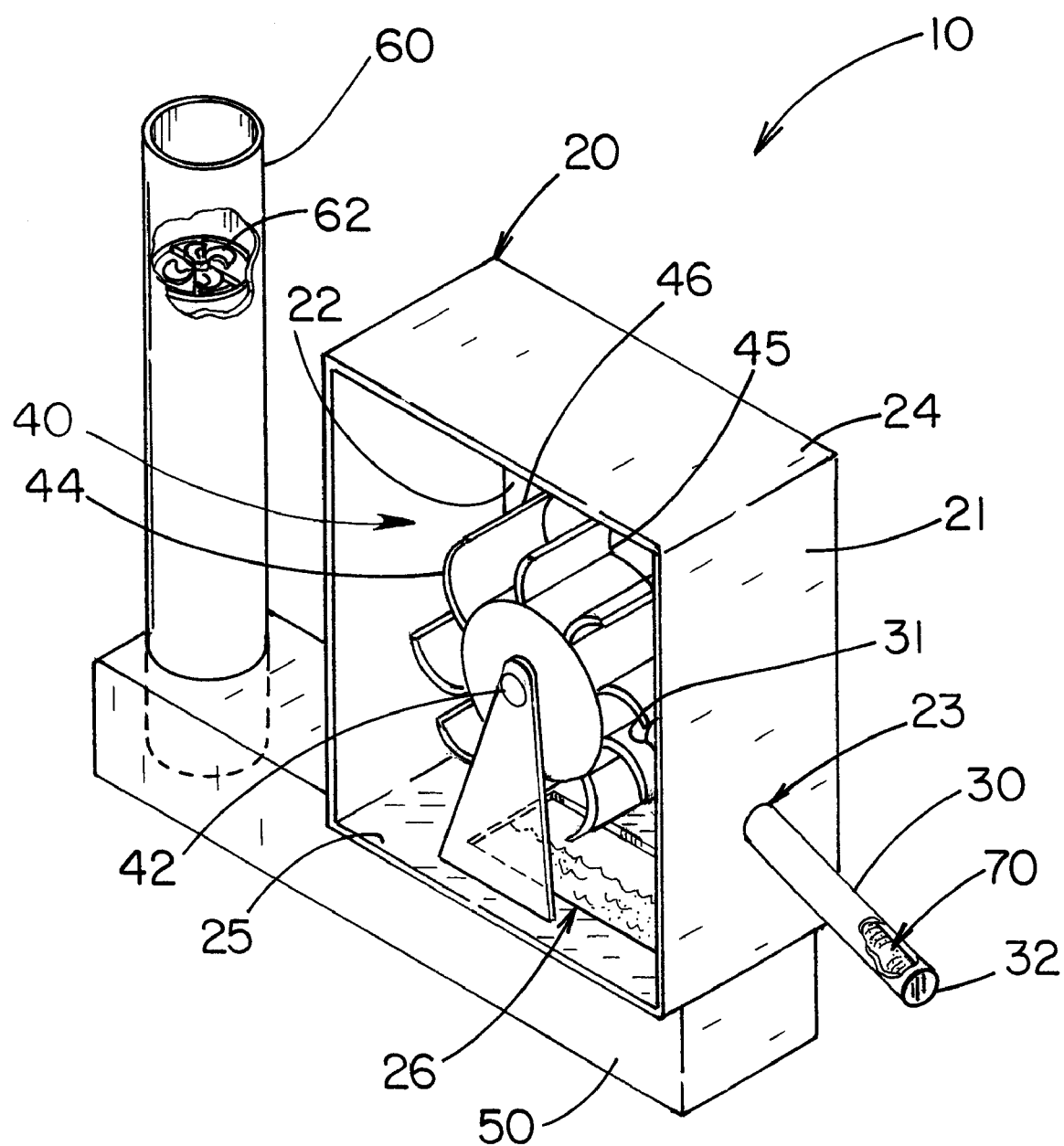
FIG. 1 is a schematic perspective view of a new solid fuel turbine drive system according to the present invention.

With reference now to the drawings, and in particular to FIG. 1 thereof, a new solid fuel turbine drive system embodying the principles and concepts of the present invention and generally designated by the reference numeral 10 will be described.

As best illustrated in FIG. 1 the solid fuel turbine drive system 10 generally comprises an housing 20, a combustion tunnel 30, a turbine assembly 40, a water bath particulate collection tank 50, and at least one solid fuel cell 70

The housing 20 consists of four side walls, a roof 24, and a or 25. The housing 20 includes a first aperture 23, which extends through a first one 21 of the side walls.

The combustion tunnel 30 has a first end 31 and a second end 32. The first end 31 extends into the housing 20 through the first aperture 23.

The turbine assembly 40 is substantially aligned with the combustion tunnel first end 31 such that gases expelled from the first end 31 will turn the turbine assembly 40.

The solid fuel cell 70 is positionable within the second end 32 of the combustion tunnel 30 such that detonation of the solid fuel cell 70 forces gasses out of the first end 31 of the combustion tunnel 30.

The water bath particulate collection tank 50 is coupled to a bottom of the housing 20. The floor 25 of the housing 20 has an opening 26. The water bath particulate collection tank 50 is in environmental communication with an interior of the housing 20.

An exhaust stack 60 is in environmental communication with the water bath particulate collection tank 50 such that excess gasses from the solid fuel turbine drive system 10 are expelled through the exhaust stack 60.

An exhaust fan 62 is positioned within an interior of the exhaust stack 60 for urging the excess gases out of the solid fuel turbine drive system 10.

The turbine assembly 40 further comprises a shaft member 42 and a plurality of fan blades 44. The shaft member 42 is positioned at the focus of the turbine assembly 40 and extends through a second aperture in a second one 22 of the side walls. The plurality of fan blades 44 each have a first end 45 coupled to the shaft member 42 and a second end 46, which extends radially outward from the shaft member 42. Each one of the plurality of fan blades 44 is used for translating a linear force from the gases expelled from the first end 31 of the combustion tunnel 30 into rotational energy.

Each one of the plurality of fan blades 44 is curved to maximize the capture of expelled gases and the translation from a linear force to a rotational force such that the shaft member 42 is capable of turnings a shaft for an electric generator.

The solid fuel cell 70 further comprises: a combustion mixture for generating cases used to rotate the turbine assembly 40 and a binding mixture for holding the combustion mixture in a predetermined shaped without the use of a casing.

In an embodiment the combustion mixture comprises coal dust, nitrate, and sulfur.

In a further embodiment the binding mixture essentially comprises sugar.

In still a further embodiment the combustion tunnel 30 is designed for rapid reloading of the solid fuel cells 70 for near continuous operation optimizing the solid fuel turbine drive system 10 for a substantially constant speed of rotation of the turbine assembly 40.

In use, the combustion tunnel is loaded with a solid fuel cell. The solid fuel cell is detonated and gasses are expelled from the first end of the combustion tunnel. The gasses strike the blades of the turbine assembly and cause the turbine assembly to rotate. Thus the shaft of the turbine assembly rotates. The particulate matter from the detonation of the solid fuel cell settles in the water bath particulate collection tank to be collected and disposed of in an environmentally friendly manner. The excess (gasses are then expelled out of the solid fuel turbine drive system through the exhaust stack assembly aided by the exhaust fan.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A solid fuel turbine drive system for powering electrical generators comprising:
   a housing consisting of four side walls a roof and a floor, said housing having a first aperture extending through a first one of said side walls;
   a combustion tunnel having a first end and a second end, said first end extending into said housing through said first aperture;
   a turbine assembly substantially aligned with said combustion tunnel first end such that gases being expelled from said first end turns said turbine assembly;
   at least one solid fuel cell positionable within said second end of said combustion tunnel such that detonation of said solid fuel cell forces gasses out of said first end of said combustion tunnel;
   a water bath particulate collection tank coupled to a bottom of said housing, said water bath particulate collection tank being in environmental communication with an interior of said housing, said water bath particulate collection tank being substantially filled with water;
   said floor of said housing having an opening extending therethrough such that gases in said housing are exhausted through said opening and through the water in said water bath particulate collection tank for separating particles in the gases and allowing the remaining gas to be exhausted to the environment.

2. The solid fuel turbine drive system of claim 1, further comprising:
   an exhaust stack in environmental communication with said water bath particulate collection tank such that excess gasses from said solid fuel turbine drive system are expelable through said exhaust stack.

3. The solid fuel turbine drive system of claim 2, further comprising:
   an exhaust fan positioned within an interior of said exhaust stack for urging said excess gases out of said solid fuel turbine drive system.

4. The solid fuel turbine drive system of claim 1, wherein said turbine assembly further comprises:
   a shaft member positioned at the focus of the turbine assembly and extending through a second aperture in a second one of said side walls;
   a plurality of fan blades each having a first end coupled to said shaft member and a second end extending radially outward from said shaft member, each one of said plurality of fan blades being for translating a linear force from said gases expelled from said first end of said combustion tunnel into rotational energy.

5. The solid fuel turbine drive system of claim 4, wherein each one of said plurality of fan blades is curved to maximize the capture of expelled gases and the translation from a linear force to a rotational force such that said shaft member is capable of turning a shaft for an electric generator.

6. The solid fuel turbine drive system of claim 1, wherein said solid fuel cell further comprises:
   a combustion mixture for generating gases used to rotate said turbine assembly;
   a binding mixture for holding said combustion mixture in a predetermined shaped without the use of a casing.

7. The solid fuel turbine drive system of claim 6, wherein said combustion mixture comprises coal dust, nitrate, and sulfur.

8. The solid fuel turbine drive system of claim 6, wherein said binding mixture essentially comprises sugar.

9. The solid fuel turbine drive system of claim 1, wherein said combustion tunnel is adapted for rapid reloading of said solid fuel cells for near continuous operation optimizing said solid fuel turbine drive system for a substantially constant speed of rotation of said turbine assembly.

10. A solid fuel turbine drive system comprising:
    a housing consisting of four side walls a roof and a floor, said housing having a first aperture extending through a first one of said side walls;
    a combustion tunnel having a first end and a second end, said first end extending into said housing through said first aperture;
    a turbine assembly substantially aligned with said combustion tunnel first end such that gases being expelled from said first end turns said turbine assembly;
    at least one solid fuel cell positionable within said second end of said combustion tunnel such that detonation of said solid fuel cell forces gasses out of said first end of said combustion tunnel;
    a water bath particulate collection tank coupled to a bottom of said housing, said water bath particulate collection tank being in environmental communication with an interior of said housing;
    said floor of said housing having an opening extending therethrough such that gases in said housing are exhausted through said opening and through the water in said water bath particulate collection tank for separating particles in the gases and allowing the remaining gas to be exhausted to the environment;
    an exhaust stack in environmental communication with said water bath particulate collection tank such that excess gasses from said solid fuel turbine drive system are expelable through said exhaust stack;
    an exhaust fan positioned within an interior of said exhaust stack for urging said excess gases out of said solid fuel turbine drive system;
    said turbine assembly further comprises:
       a shaft member positioned at the focus of the turbine assembly and extending through a second aperture in a second one of said side walls;
       a plurality of fan blades each having a first end coupled to said shaft member and a second end extending radially outward from said shaft member, each one of said plurality of fan blades being for translating a linear force from said gases expelled from said first end of said combustion tunnel into rotational energy;

each one of said plurality of fan blades is curved to maximize the capture of expelled gases and the translation from a linear force to a rotational force such that said shaft member is capable of turning a shaft for an electric generator;

said solid fuel cell further comprises:
  a combustion mixture for generating gases used to rotate said turbine assembly;
  a binding mixture for holding said combustion mixture in a predetermined shaped without the use of a casing;

wherein said combustion mixture comprises coal dust, nitrate, and sulfur;

wherein said binding mixture essentially comprises sugar; and wherein said combustion tunnel is adapted for rapid reloading of said solid fuel cells for near continuous operation optimizing said solid fuel turbine drive system for a substantially constant speed of rotation of said turbine assembly.

* * * * *